United States Patent [19]
Ekola

[11] Patent Number: 5,113,709
[45] Date of Patent: May 19, 1992

[54] CONVERTIBLE WEB TENSION TRANSDUCER

[76] Inventor: Kenneth E. Ekola, 574-6th St., Dover, N.H. 03820

[21] Appl. No.: 529,857

[22] Filed: May 29, 1990

[51] Int. Cl.$^5$ .............................................. G01L 5/10
[52] U.S. Cl. ................................................ 73/862.48
[58] Field of Search ..................................... 73/862.48

[56] References Cited

U.S. PATENT DOCUMENTS

| | | | |
|---|---|---|---|
| 4,326,424 | 4/1982 | Koenig | 73/862.48 |
| 4,691,579 | 9/1987 | Ekola | |
| 4,784,004 | 11/1988 | Ekola | |
| 4,899,599 | 2/1990 | Eddens | 73/862.48 |

*Primary Examiner*—Charles A. Ruehl
*Attorney, Agent, or Firm*—Davis, Bujold & Streck

[57] ABSTRACT

A convertible web tension transducer and a roll assembly including two such transducers in which each transducer includes a coupling supported by a pair of resilient beams from a support member through a self-aligning bearing permitting pivotal movement of the coupling relative to the support member in any direction normal to a roll axis of the transducer and the roll assembly and being provided with a pivot pin arrangement to prevent relative rotation of the coupling and support member when a stationary shaft supporting a live roll is supported by the couplings of the transducers, the pivot pin arrangement including a pivot pin which may be omitted from the transducer when a live shaft or roll is supported by the couplings of the two transducers with a consequent requirement for relative rotation of the coupling and support member, about the roll axis, to be permitted.

6 Claims, 2 Drawing Sheets

CONVERTIBLE WEB TENSION TRANSDUCER

BACKGROUND OF THE INVENTION

The present invention relates to apparatus for supporting and guiding a moving web in tension and, more particularly, to apparatus to be used in a spaced combination of two for supporting a roll and providing a signal output reflecting force on the roll at the points of support comprising, a coupling for fixed attachment to a shaft (live carrying a roll fixedly attached thereto or stationary carrying a roll on bearings supported thereon) or a live roll; at least one resiliently bendable beam supported at one end by a support member and extending therefrom to resiliently support the coupling; a self aligning ball bearing being disposed between the coupling and the beam; pivot pin means interconnecting, when installed, the coupling and the support member to prevent relative rotation thereof about the shaft or roll axis while permitting pivotal movement normal to that axis; and means to provide signals representing web tension forces transmitted to the beam(s), the coupling and support member being capable of relative rotation when the pivot pin means is not installed.

Tension transducers are well known in the art and are manufactured and sold commercially by a number of companies including the applicant's company, Dover Flexo Electronics, Inc. A web tension transducer is used to measure tension in any moving web. The output signal produced can be displayed for manual control of the tension or can be used for automated control. They are typically used in printing presses, coaters, laminators, textile machines, slitter-rewinders, sheeters, papermaking machines, and any other machines which in some way processes a continuous web of paper, plastic film, metal, textile, non-woven textile, felt, rubber, or any combination of the foregoing. Variations of web tension can cause web breakage, slack web, wrinkling, curling, stretching, and in general, poor quality product and excessive waste. These problems can be eliminated by proper control of web tension. The basis of proper control is tension measurement. The basis of measurement is a transducer which will convert a force (web tension) into an electrical signal which can be used for control purposes. The transducer must be accurate regardless of web speed and tension or it will not allow the correction of the aforementioned problems.

Prior art tension transducers are typified by U.S. Pat. No. 4,691,579 issued to applicant herein, entitled TENSION TRANSDUCER, and assigned to the assignee of this invention, the transducer is incorporated into a supportive joint used to support a rotating or nonrotating shaft having the roll over which the web is moving mounted thereof. The joints are used in pairs one at each end of the roll.

This prior art transducer is of a cantilevered beam type wherein a force to be measured is applied perpendicularly to the end of the beam through the joint and the improved joint comprises a self-aligning first roller bearing having an axially aligned center bore and a cylindrical outer surface. A cylindrical inner member is carried by the end of the beam while a cylindrical outer member is provided having cylindrical inner and outer surfaces. The cylindrical inner surface is of a diameter to be a sliding fit about the outer surface of the first roller bearing and has parallel, spaced, inward facing ridges thereon of a spacing greater than the width of the first roller bearing. A biasing device urges the first roller bearing toward a neutral position. A second roller bearing having a center bore with a radius larger than the radius of the cylindrical outer surface of the cylindrical outer member is disposed concentrically thereabout in alignment with the first roller bearing. There is a device for non-movably supporting the second roller bearing with respect to the cantilevered beam. The force receiving device comprises a cylindrical bushing for receiving a shaft to be supported by the first roller bearing.

When this prior art transducer is used with a live roll mounted by bearings on what is intended to be a stationary shaft, that shaft will often rotate in the self-aligning bearing about the roll axis. This is detrimental to the performance of the transducer and the roll if the shaft is not straight and/or balanced. Further stationary shafts tend to be lighter than those which are intended to carry loads while rotating and thus subject to bending.

Wherefore, it is the object of the present invention to provide a convertible web tension transducer for web support and tension measurement which can be readily adapted for use with live shafts carrying rolls, stationary shafts carrying live rolls and directly with live rolls, which when used with stationary shafts carrying live rolls does not exhibit the disadvantages attendant undesired rotation of such shafts that was possible with the prior art transducer of U.S. Pat. No. 4,691,579.

It is another object of the present invention to provide a web tension transducer having a simple inexpensive means for adapting the transducer to the different uses.

Other objects and benefits of the present invention will become apparent from the description contained hereinafter taken in conjunction with the drawing figures which accompany it.

SUMMARY OF THE INVENTION.

The foregoing objects have been attained by the convertible web tension transducer of the present invention comprising, a coupling non-movingly attachable to a shaft or roll defining a roll axis; at least one resiliently bendable beam carried by the coupling and extending therefrom to a support member, the coupling being resiliently carried by the beam; a self-aligning bearing being disposed between the coupling and support member to permit relative rotation therebetween, a pivot pin means being disposed, when installed in the transducer, to prevent said relative rotation only about said roll axis; and means being provided to output signals indicating the extent of beam deflection, the coupling and support member being free for relative rotation about said roll axis when said pivot pin means is not installed in the transducer.

The self-aligning bearing eliminates any bending couple at the ends of the beam whereby linearity of output signal to web tension is ensured and also accommodates any misalignment between pairs of transducers.

DESCRIPTION OF THE DRAWINGS

The invention will now be described, by way of example, with reference to the accompanying drawings, in which.

DESCRIPTION OF THE PREFERRED EMBODIMENT

Figure 1:
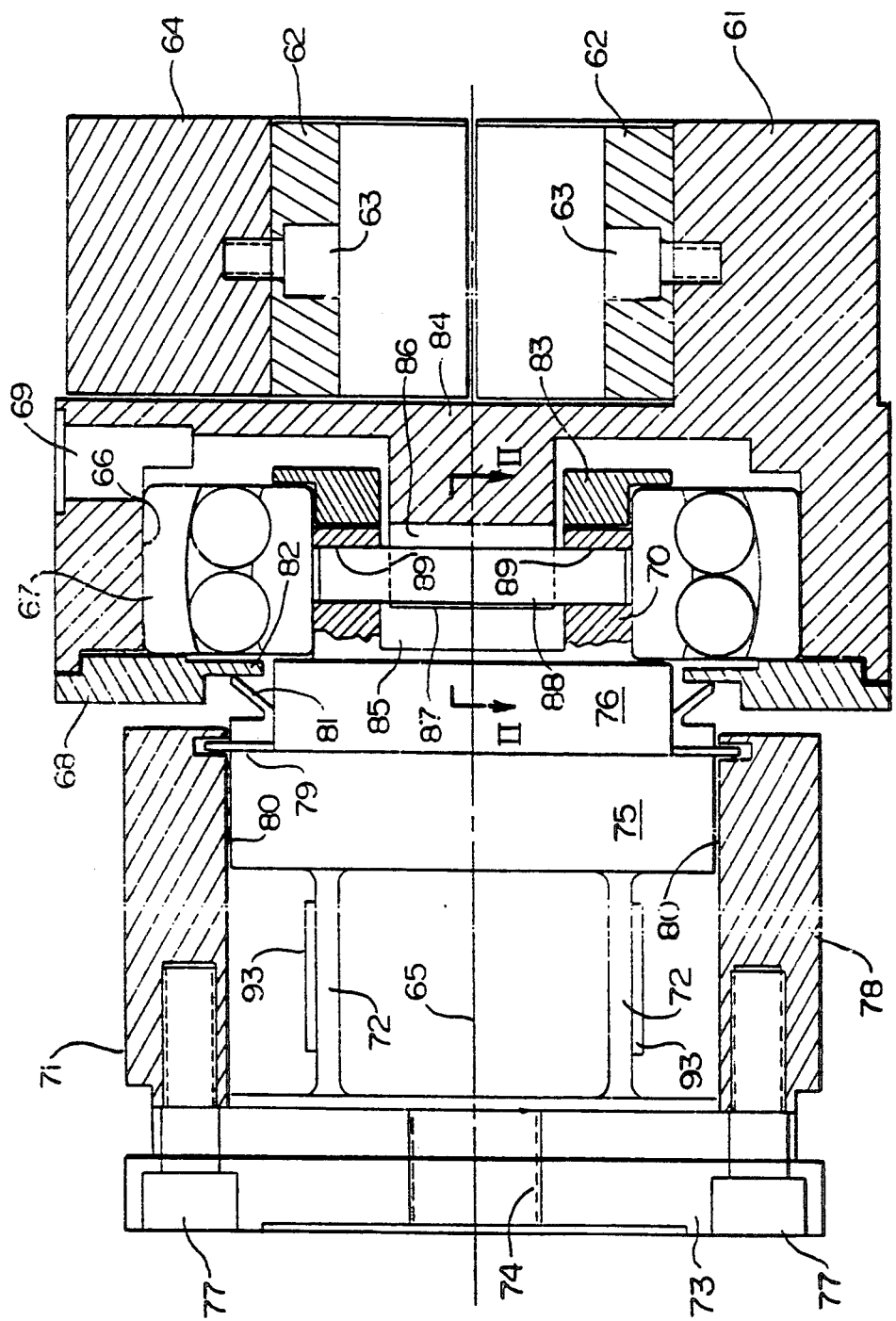
FIG. 1 is a partially cutaway longitudinal cross-section of the present invention.
Figure 2:
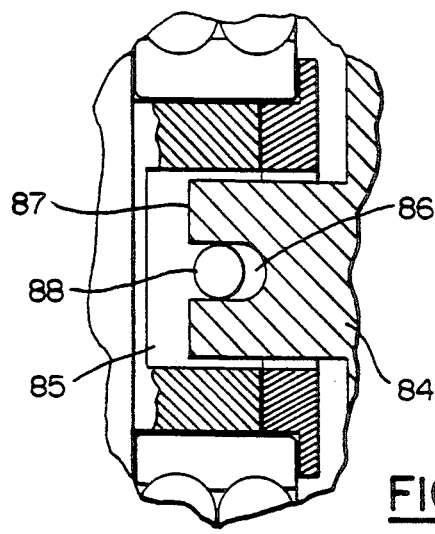
FIG. 2 a fragmentary cross-section on section line II—II of FIG. 1.

With referenced to FIGS. 1 and 2, a coupling 61 supports the bottom half of a bushing 62 by means of allen screw 63. The top half of the bushing 62 is supported by a cap 64 which is attached to the coupling 61 by screws (not shown) whereby the bushing 62, may engage and fixedly clamp the shaft of a roll defining a roll axis 65. Remote from the bushing 62 the coupling 61 defines a circular recess 66 for intimately receiving the outer race of a self-aligning bearing 67 which is retained in the recess 66 by an annular outer bearing retainer 68 fixedly attached to the coupling 61 by screws (not shown). A grease fitting 69 is provided in the coupling for lubrication of the self-aligning bearing 67.

Figure 3:
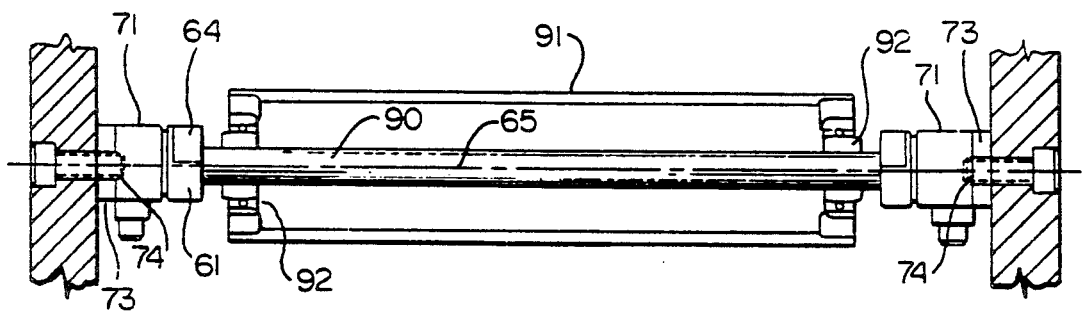
FIG. 3 is a diagrammatic partially sectioned elevation of a pair of transducers of FIGS. 1 and 2 supporting a stationary shaft with a live roll supported thereon.

The inner race of the self-aligning bearing 67 engages a boss 70, having an axis coincident with the roll axis 65, forming part of a beam structure 71. The boss 70 is an integral part of the beam structure 71 which includes parallel similarly oriented resilient beams 72 and a support member 73 that includes a threaded opening 74 by which the beam structure 71 and coupling 61 may be rigidly attached to a support member by fastening means (see FIG. 3).

The beams 72, which are superposed one above the other for deflection in a vertical direction (i.e. vertically in the plane of the cross-section of FIG. 1), are connected to the boss 70 by way of a beam deflection stop member 75 which carries a seal supporting portion 76. A beam housing 78 is connected by allen screws 77 to the beam structure 71 and this housing cooperates with a dust seal 79 supported on the seal supporting portion 76 to prevent access of extraneous material into the beam housing 78. The beam housing defines an interior surface 80 above and below the stop member 75 which, in the rest position of the transducer, provides a deflection limiting clearance of approximately 0.005". By this arrangement, overloading and over deflection of the beams 72 is avoided, should excessive loads be applied to the transducer by a roller supported thereby.

The seal supporting portion 76 also supports a dynamic lip seal 81 which engages an annular sealing surface 82 formed on an outer surface of the outer bearing retainer 68 thereby to provide a seal for the self-aligning bearing 67.

The inner race of the self-aligning bearing 67 is retained on the boss 70 by an inner bearing retainer 83 which is attached, by screws (not shown), to the boss 70.

The coupling 61 defines a boss 84 coaxial with and extending axially along roll axis 65 into the circular recess 66 of the coupling 61 within a central cylindrical opening 85 formed in the boss 70 with radial clearance therebetween whereby relative rotation between the boss 84 and opening 85 is possible. The boss 84 defines a transverse slot 86 (see FIG. 2) centered on the roll axis 65 and extending normal thereto. This transverse slot 86 is open at the end face 87 of the boss 84 and has a width closely, though freely, to accommodate a pivot pin 88, supported in bores 89 defining a pin axis intersecting and normal to the roll axis 65. The pin 88 is held captive in the bores 89 by the inner face of the inner race of the self-aligning bearing 67. The intersection of the pin and roll axes is coincident with pivot axes of the self-aligning bearing 67.

The presence or absence of the pin 88 provides the convertability of the transducer of the present invention. When the pin is installed, the transducer is suitable for use with a stationary shaft 90 (FIG. 3) on which a roll 91 is mounted by means of bearings 92 for free rotation about the shaft. While restraining rotation of the coupling 61 relative to the support member 73 and thus preventing the shaft 90 from rotating about the roll axis, the pin 88 permitting pivotable movement of the coupling 61 normal to the roll axis 65 relative to the beam structure 70 (about the pivot axes of the self-aligning bearing) thereby allowing the self-aligning bearing 67 to self-align in a manner that the beams 72 are simply deflected without unnecessary bending couples being produced. By this means, the beams are simply deflected and linearity of output signal to load can be assured.

The beams 72 are provided with strain gauges 93, disposed on at least one of each of their horizontal surfaces (strain gauges can be provided on both surfaces if desired), the output from which provides an accurate measure of the tension being applied by a web contacting the roll 91.

Figure 4:
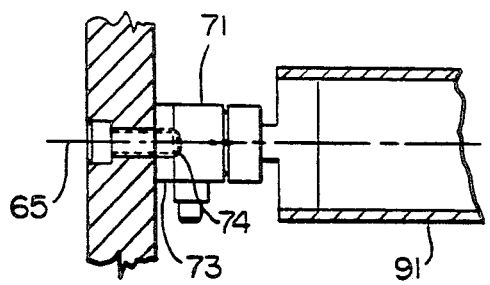
FIGS. 4 and 5 are fragmentary partially sectioned elevations of a transducer of FIGS. 1 and 2 supporting respectively a live shaft and roll assembly and a live roll.
Figure 5:
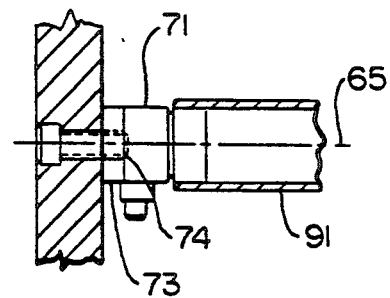

If the support of a live shaft or live roll is the intended use of the transducer, the pin 88 is simply omitted during assembly whereby the coupling 61 will be free to rotate, relative to the beam structure 71 and the support member 73, about the roll axis 65 while retaining its freedom to pivot in directions normal to that axis 65 (thus with the pin omitted the coupling 61 is free to pivot about all three mutually perpendicular axis). The arrangement for the support of a live shaft (that is one that rotates with the roll support) is shown in FIG. 4, this being an arrangement in which the pin 88 would be omitted during assembly, a further arrangement in which the pin would be omitted is shown in FIG. 5 wherein a roll 91 is directly supported on the exterior surface of the coupling 61 by means of set screws (not shown).

It will be appreciated that in the support of rolls by the transducer of the present invention, a pair of these transducers mounted by their support members 73 to a support structure are aligned on a roll axis 65 with a roll supported between them.

It will be appreciated to those skilled in the art that with the above described transducer construction of the present invention, no mechanical pre-load is experienced and that both with a live shaft and a stationary shaft mode of operation, the freedom of the transducer to pivot under the guidance of the self-aligning bearing 67, in any direction normal to roll axis 65, ensures that no undesired bending couples are applied to the beams 72 thus ensuring their linear operation in a simple bending mode. It will also be appreciated while providing this advantageous and simple construction, the transducer of the present invention is readily and easily convertible from a live shaft/roll operation to a stationary shaft operation thereby minimizing the number of models of transducers necessary to fulfill the needs of the industries concerned.

I claim:

1. A web tension transducer convertible to support a live roll supporting shaft, a live roll and a stationary shaft supporting a live roll comprising:
   a) a coupling for fixed attachment to one of a shaft and a roll defining a roll axis;
   b) a resiliently bendable beam carried by a support member;
   c) the coupling being resiliently carried by said beam by way of a self-aligning bearing disposed to permit relative rotation therebetween, wherein said beam is part of a beam structure having mans for supporting one race of the self-aligning bearing;
   d) means to provide an output signal representing deflection of said beam; and
   e) selectively used means which, when installed in the transducer, prevents said relative rotation only about said roll axis, the coupling and support member being free for relative rotation about said roll axis when said means is not installed in the transducer, said selectively used means comprising a pivot pin, supported in a bore i one of the beam structure and coupling, extending normal to said roll axis and defining a pin axis intersecting that roll axis, said pin passing through in close proximity to transverse walls of a slot, defined by the other of the beam structure and coupling, extending normal to said axis, the presence of the pin in the slot preventing relative rotation, about said roll axis, between the coupling and the support member when the pin is installed in the transducer, the omission of the pin from the transducer, allowing relative rotation of the coupling relative to the support member about said roll axis.

2. A convertible web tension transducer according to claim 1, further comprising another resilient bendable beam, and said two resiliently bendable beams are disposed in parallel and form a pair of bendable beams for deflection together in the same direction, said pair of bendable beams are evenly disposed on opposite sides of said roll axis and each is resiliently deformable toward and away from said roll axis.

3. A convertible web tension transducer according to claim 2, wherein said pair of beams have stop means, disposed at ends of the beams most adjacent the coupling, defining, with a beam housing, a beam deflection limiting clearance allowing a desired beam deflection while preventing excessive deflection due to overloads.

4. A convertible web tension transducer according to claim 3, wherein a dust seal is provided between the beam housing and the stop means to prevent entry of undesirable materials into the interior of the beam housing and a dynamic lip seal is mounted on the stop means to engage a seal surface of a bearing retainer fixedly attached to the coupling, said bearing retainer retaining the self-aligning bearing in engagement with the coupling and the dynamic lip seal preventing ingress of undesirable materials and egress of lubricant respectively to and from the self-aligning bearing.

5. A roll assembly comprising a pair of transducers according to claim 1, with the couplings rigidly attached to a stationary shaft supporting a live roll by means of bearings, a said selectively used means being installed in each transducer to prevent relative rotation only about said roll axis.

6. A roll assembly comprising two transducers according to claim 1 wherein the couplings are rigidly attached to one of a live shaft and roll for rotation therewith, said pin being omitted from the transducers thereby to permit the coupling to rotate about the roll axis relative to the support member.

* * * * *